Sept. 2, 1952      G. D. HUNTER      2,608,994
CONTROL VALVE FOR POWER TRANSMISSIONS
Original Filed July 5, 1941      3 Sheets-Sheet 2
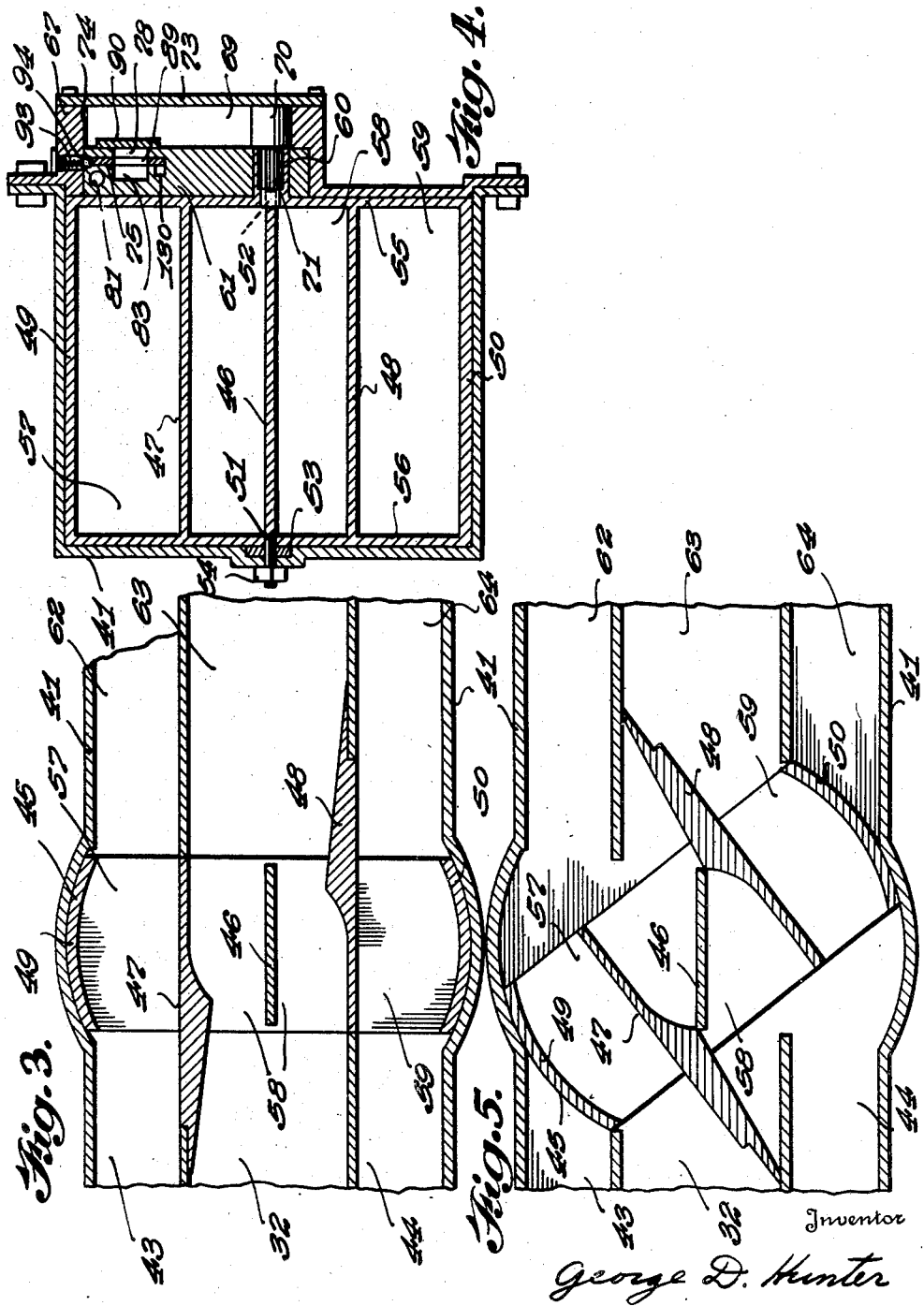
Inventor
George D. Hunter
By Davis & Davis
ATTORNEYS Sept. 2, 1952   G. D. HUNTER   2,608,994
CONTROL VALVE FOR POWER TRANSMISSIONS
Original Filed July 5, 1941   3 Sheets-Sheet 3
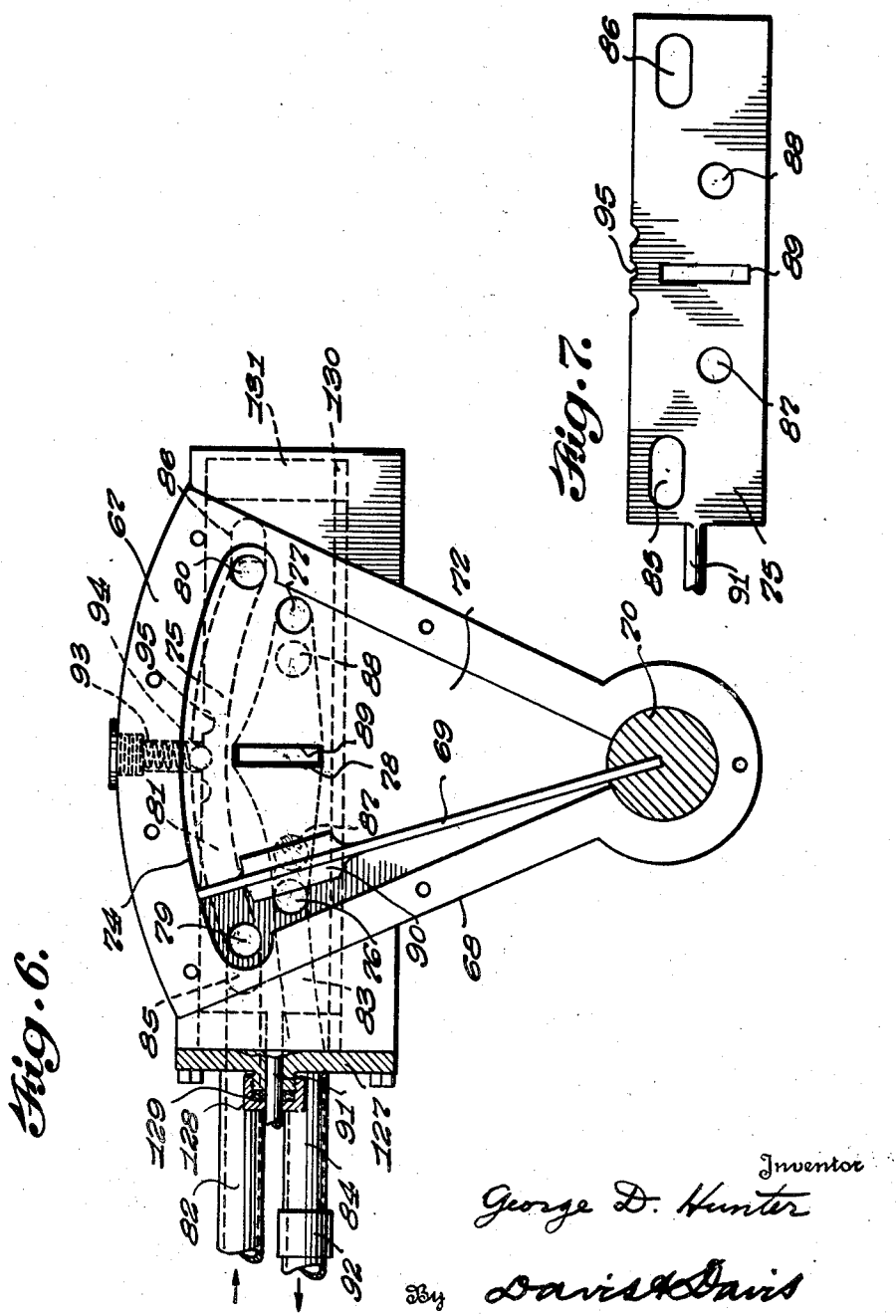
Inventor
George D. Hunter
By Davis & Davis
Attorneys Patented Sept. 2, 1952

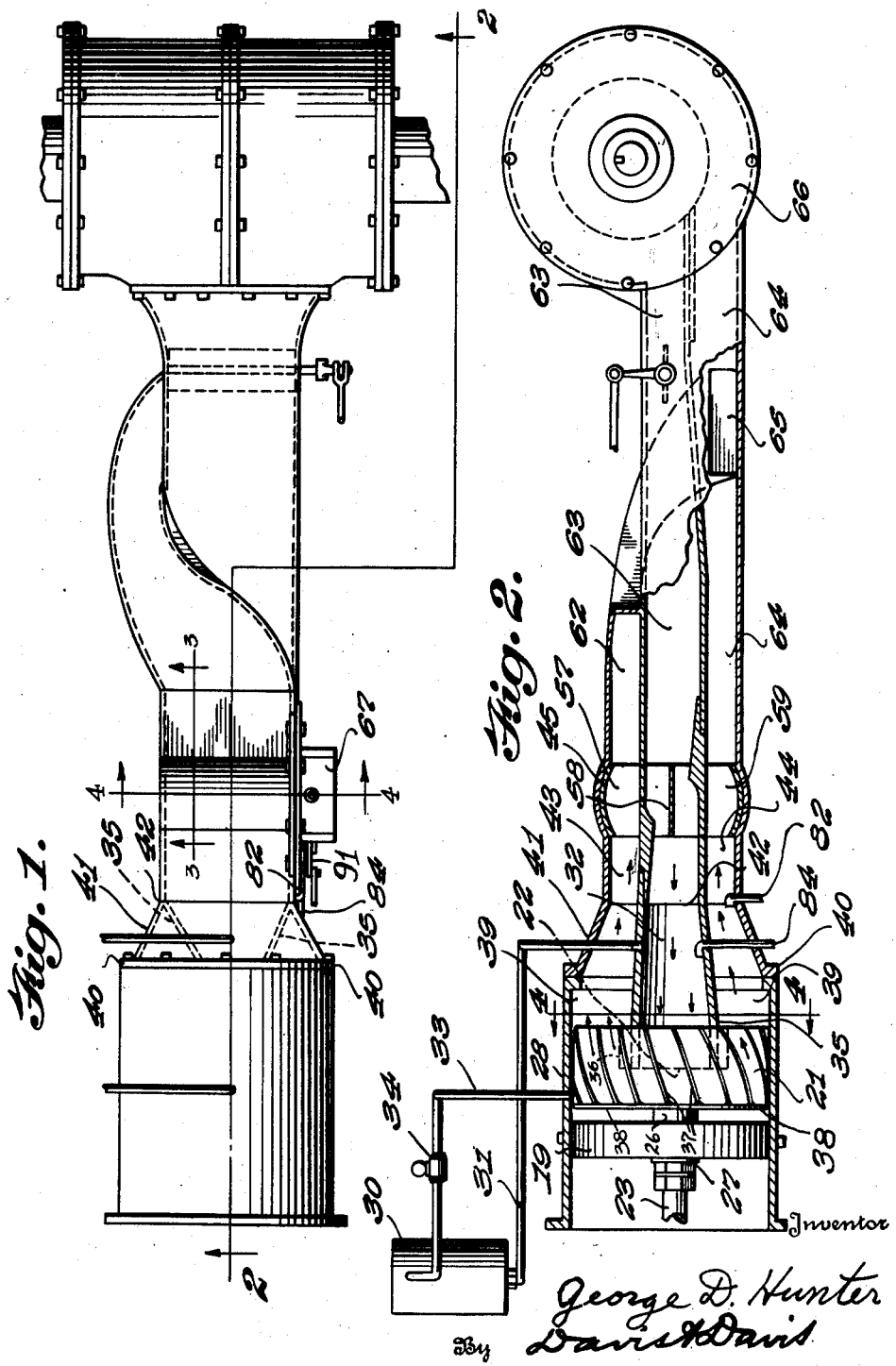

2,608,994

UNITED STATES PATENT OFFICE 2,608,994

CONTROL VALVE FOR POWER TRANSMISSIONS

George D. Hunter, Rocky Mount, N. C.

Original application July 5, 1941, Serial No. 401,248, now Patent No. 2,422,901, dated June 24, 1947. Divided and this application January 3, 1947, Serial No. 720,026

5 Claims. (Cl. 137—597)

1

This application is a division of my copending application Ser. No. 401,248 filed July 5, 1941, now U. S. Patent No. 2,422,901 granted June 24, 1947, and relates to improvements in a valve for a power transmission of the fluid type.

An object of the invention is to provide an improved novel control valve mechanism for connecting between a fluid pump and motor for controlling the direction of flow of the fluid medium from the pump into the motor of a power transmission and accordingly the direction of rotation of the motor.

Another object of the invention is to provide a simple and efficient servo mechanism for operating the control valve mechanism.

Another object of the invention is to provide a control mechanism having a novel vane type servomotor for positioning the control valve mechanism.

Another object of the invention is to provide a novel servocontrol valve for the motor including a manually operable valve plate having suitable ports for effecting adjustment of the servomotor under pressure of the fluid medium of the power transmission system.

These and other objects and features of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

In the drawings:

Figure 1 is a top plan view of the device.

Figure 2 is a cross section of Figure 1 taken along the line 2—2 and looking in the direction of the arrows with certain parts broken away.

Figure 3 is an enlarged sectional view taken along the lines 3—3 of Figure 1.

Figure 4 is an enlarged sectional view taken along the line 4—4 of Figure 1.

Figure 5 is a view of Figure 3 with the control valve pivoted in another adjusted position.

Figure 6 is a front elevation of the servomotor mechanism with the cover plate removed.

Figure 7 is a front elevation of the servo valve plate member shown in Figure 6.

Referring to the drawings of Figures 1 and 2, the power transmission mechanism comprises a rotary pump 21 of the centrifugal type with an inlet 22 at the center thereof as described and claimed in my application Ser. No. 401,248 filed July 5, 1941, and now U. S. Patent No. 2,422,901

2 granted June 24, 1947. The said rotary pump 21 has a rotary member 26 splined or connected in any convenient manner to a shaft 23 which is in turn connected to the prime mover or source of power.

The rotary member 26 is journaled so as to rotate on suitable bearings positioned in a forward end plate 19 and the said rotary member 26 has provided at the end thereof screw threads to which there are engaged screw threaded nuts 27 by means of which the pump member 21 is rotatably fastened in the forward end plate 19. The forward end plate 19 is further bolted or secured in any convenient manner to a casing 28 so as to seal the forward end of the said casing 28 from the loss of the fluid medium, preferably oil held by the said casing.

A tank 30 for supplying the pump 21 with a fluid medium preferably oil is provided having an outlet pipe 31 leading into a channel 32 which is connected to the inlet opening 22 of the pump 21. Further, there is provided an inlet pipe 33 to the said supply tank 30. The said inlet pipe 33 having an opening at the side of the pump 21 as shown in Figure 2 and the said inlet pipe 33 has further provided a pet cock 34 for opening and closing the said inlet to the supply tank 30.

The said channel 32 is formed by a casing 35 which at the opening or inlet 22 of the pump 21 is circular in shape and is journaled at the forward end thereof so that a collar 36 of the pump 21 may revolve freely thereon. The said casing 35 at the forward end thereof fits within a collar 36 as shown in Figure 2. Attached to the collar 36 of the pump 21 are a plurality of blades 37 which are spaced an equal distance apart and are curved transversely in such a manner that upon rotation of the said pump the concave side of each of the said transversely curved blades will strike the fluid medium. The said blades 37 extend forward from the said collar 36 at an acute angle thereto slanting in the direction of the rotation of the said pump 21. The said blades 37 are secured at the forward end to a rotary plate 38.

The forward plate 38 is separated from the collar 36 so that a fluid medium preferably oil upon being forced into the inlet 22 will be fed to the blades 37 through the said space provided between the collar 36 and plate 38 and into the spaces separating the said blades 37. The said blades 37 are so adapted that upon the rotation thereof the said blades will force the fluid medium fed thereto axially toward the rear of the machine as indicated by the arrows in Figure 2.

At the idle speed of motor or source of power there is very little force created and therefore no clutch is necessary to relieve the motor of its load. At high speed however great force is created and the speed with which the fluid medium or oil is forced rearward will increase in proportion to the lessening of the resistance against the rearward flow of the said fluid medium.

There is surrounding the pump 21 and the casing 35 the second and outer casing 28 which is circular in shape. The space between the inner casing 35 and the casing 28 forms an outlet channel 39 for the pump 21.

At 40 the end of the outer casing 28 is bolted to the end of a second casing 41. Further from the point 40 the side walls of the casing 35 project outwardly as shown in dotted lines in Figure 1 while the side walls of the casing 41 begin to extend inwardly until at a point 42 the ends of the side walls of the casing 35 are welded or fastened in any convenient manner to the sides of the casing 41. From the point 42 the opposite side walls of the said casing 41 continue rearwardly in a parallel relation.

From the point 40 the top and bottom walls of the said casing 41 extend downwardly and upwardly respectively as shown in Figure 2, to the point 42, while the top and bottom walls of the casing 35 extend from the point 40 rearward in substantially parallel relation as shown in Figure 2. The side edges of the top and bottom walls of the casing 35 extending from the point 42 are welded or fastened in any convenient manner to the side walls of the casing 41.

Thus at the point 42 there are formed three separate passageways, the inlet channel 32 and outlet channels 43 and 44 connected to the channel 39 as shown in Figure 2.

At the rearward end of the channels 32, 43 and 44 there is provided a pivotally mounted control valve 45 shown in Figure 2 and in detail in Figures 3, 4 and 5.

The valve 45 has provided side walls 55 and 56 to which are securely fastened peripheral top and bottom walls 49 and 50 and partition walls 47 and 48 forming three channels 57, 58 and 59.

The top and bottom walls of the casing 41 are curved as shown in Figures 2, 3 and 5 so as to house the peripheral top and bottom walls 49 and 50 of the valve 45. The said walls 49 and 50 being adapted to be adjusted upon pivotal movement of the valve 45.

The valve 45 has the side walls thereof 55 and 56 pivoted on a shaft 51 and a shaft 52 respectively indicated in Figure 4 and which shafts project from the opposite ends of a rigidly mounted partition wall 46. The said partition wall 46 is mounted between the partition walls 47 and 48.

The shaft 51 of the partition wall 46 is splined or fastened in any convenient manner to a member 53 which is engaged in the side wall of the casing 41 so as to prevent the pivoting or turning of the partition wall 46 upon the pivotal movement of the valve 45. The said shaft 51 is fastened at the outer side of the casing 41 by a securing nut 54.

The valve 45 further has provided a sleeve member 60 which is journaled in a housing member 61 so that the valve 45 may be readily pivoted either by manual means or by a simple power shift illustrated herein in Figures 4 and 6 and which will be explained in detail hereinafter.

Rearward of the valve 45 there is formed in the casing 41 channels 62, 63 and 64. As shown in Figure 2 the channel 62 is connected to the channel 64 at opening 65 and the channels 63 and 64 are attached to opposite channels of a motor of the expansible chamber type operated by fluid under pressure, and said motor indicated generally by the numeral 66. The motor 66 may be of a type described and claimed in my divisional U. S. application Ser. No. 720,025, filed January 3, 1947, and now U. S. Patent No. 2,536,938 granted January 2, 1951.

Thus it will be readily seen that if the fluid medium is forced into the motor 66 through channel 63 the motor 66 will rotate in one direction, while if the fluid medium is forced into the motor 66 through channel 64 the motor will rotate in the opposite direction. It will be readily seen that the direction of the flow of the fluid medium in the channels 63 and 64 may be reversed by the adjustment of the valve 45.

Thus if the valve be adjusted as shown in Figure 3 the fluid medium in the channels 43 and 44 impelled by the rotary pump 21 will be forced through the corresponding valve channels 57 and 59 into the channels 62 and 64. The fluid medium in the channel 62 will be forced through the opening 65 as previously described into the channel 64 where the same is combined with the fluid medium therein under force of the rotary pump 21. The said fluid medium from the channel 64, Figure 2, will force the motor indicated generally by the numeral 66 to rotate in a counter-clockwise direction. The said fluid medium returning through the channel 63 which fluid medium with the valve adjusted as shown in Figure 3 will pass through the valve channel 58 through to the channel 32 to the inlet opening 22 and returning thereby to the rotary pump 21.

Upon pivoting the valve 45 to the position shown in Figure 5 the channel 43 will be closed by the peripheral wall 49 of the valve 45 so that the fluid medium under force of the rotary pump 21 must be carried by the channel 44. However, the peripheral wall 50 of the valve 45 in the adjusted position shown in Figure 5 will close the channel 64 to the flow of the fluid medium in the channel 44. Moreover upon pivoting the valve 45 to the adjusted position shown in Figure 5 the fixed partition wall 46 will close the channel 58 of the valve 45 and the fluid medium in the channel 44 will be directed through the valve channel 59 into the channel 63. The said fluid medium in the channel 63 Figure 2 under force of the rotary pump 21 will force the motor 66 to rotate in a clockwise direction, the said fluid medium returning through the channel 64. However since the channel 64 is blocked by the peripheral wall 50 of the valve 45 the returning fluid medium in the channel 64 will pass through the opening 65 into the channel 62. From the channel 62 the returning fluid medium will pass through the valve channel 57 into the channel 32 to the inlet opening 22 of the rotary pump 21.

Thus it will be readily seen that by adjusting the valve 45 to the position shown in Figure 3 the fluid medium under pressure of the rotary pump 21 will be directed so as to rotate the motor 66 in a counterclockwise direction and by adjusting the valve 45 to the position shown in Figure 5 will cause the motor 66 to be rotated in a clockwise direction. Further if the valve 45 be adjusted to a position between that shown in Figure 3 and the extreme position shown in Figure 5 the fluid medium under pressure of the rotary pump 21 will be directed so as to have a neutral effect on the motor 66. In the neutral position the partition walls 47 and 48 and the peripheral wall 49 of the valve 45 are adjusted so as to permit the fluid medium under pressure in the channels 43 and 44 to pass directly into the return channel 32 without passing through the motor 66.

In order to pivot the valve 45 to the three positions noted that is forward, reverse and neutral there is provided an improved power shift indicated generally in Figures 1, 4 and 6 by the numeral 67.

The power shift 67 is composed of a V-shaped box 68 bolted or fastened in any suitable manner to the side wall of the casing 41 as shown in Figures 1 and 4 and fitted about the sleeve member 60 of the valve 45. A lever plate 69 is fitted and secured at the lower end in a slot formed in a shaft 70 which is splined or fastened in any convenient manner to the sleeve member 60 as shown by numeral 71. The said shaft 70 is further pivotally engaged by the shaft 52 formed at the end of the fixed partition plate 46.

The shaft 70 is pivoted by movement of the lever plate 69 in the V-shaped chamber 72. The said lever plate 69 is adapted to swing on the said shaft 70 in the V-shaped chamber 72 from one end of the said chamber 72 to the other end thereof. The plate 69 extends within the chamber 72 from the inner edge of the housing 61 to the inner edge of the cover plate 73 and from the shaft 70 to the upper peripheral edge 74 of the chamber 72, thus serving as an adjustable plate partitioning the said chamber 72. The swinging adjustment of the lever plate 69 causes a corresponding adjustment of the valve 45 to the forward, reverse or neutral positions previously described.

In order to control the adjustment of the lever plate 69 I have provided a rectangular shaped valve plate 75 Figure 7 slidably fitted in a channel 131 in the housing 61 as shown in Figure 4 and in dotted lines in Figure 6.

The said valve plate 75 controls openings 76, 77, 78, 79 and 80 in the housing 61. Openings 79 and 80 are pressure vents which are connected through openings in the valve plate 75 to a channel 81 shown in dotted lines in Figure 6. The said channel 81 is connected to a conduit 82 which is in turn connected to the pressure channel 44 as shown in Figure 2.

Openings 76, 77 and 78 are outlet vents which through openings in the valve plate 75 are connected to channel 83 in housing 61 as shown in dotted lines in Figure 6. The channel 83 is connected to a conduit 84 which is connected to the inlet channel 32 as shown in Figure 2.

The valve plate 75 has provided openings 85 and 86 adapted to control the vents 79 and 80 respectively; and openings 87 and 88 adapted to control the vents 76 and 77 respectively. Further there is provided an opening 89 adapted to control the vent 78.

Moreover at the upper end of the adjustable plate 69 is provided a plate 90 adapted to separately close each of the outlet control openings 76, 77 and 78 provided in the said housing 61.

Further the valve plate 75 is positioned within a suitable channel 131 provided in the housing 61 and may be slidably adjusted by a rod 91 which may be controlled by cable or similar contrivance adjusted from dash or steering column. The channel 131 within which the valve plate 75 is slidably positioned is closed by a plate 127. The rod 91 protrudes through the plate 127 and has provided a nut 128 screwed on to the plate 127 and a packing 129 adapted to prevent loss of the fluid medium from the said channel.

When by adjustment of the rod 91 the valve 75 is slidably positioned to the extreme left in Figure 6 the opening 86 of the valve 75 coincides with the pressure vent 80 and opening 87 of the valve 75 coincides with the outlet vent 76 and all other vents in the housing 61 are closed by the valve 75.

The fluid medium preferably oil will then flow from the channel 81, through the valve opening 86 and out the pressure vent 80 under pressure of the rotary pump 21 into the chamber 72 forcing the lever plate 69 to swing toward the left under pressure of the said fluid medium. Any of the fluid medium at the opposite side of the lever plate 69 will be forced out through the outlet vent 76, through the valve opening 87 and through the channel 83 to the channel 32, until the plate 90 mounted at the upper end of the said plate 69 covers the outlet vent 76 thereby closing the said opening and cutting off further escape of the said fluid medium. The said movement of the plate 69 will pivot the shaft 70 causing the adjustment of the valve 45 to the position shown in Figure 5.

When the sliding valve 75 is adjusted to the extreme right in Figure 6, the valve opening 85 will coincide with the pressure vent 79 and valve opening 88 will coincide with the outlet vent 77 all other vents in the housing 61 are closed by the valve plate 75.

The fluid medium under pressure in the channel 81 will then pass through the valve opening 85 and out of the vent 79 forcing the plate 69 to swing to the right, the fluid medium at the opposite side of the plate 69 expelling through the outlet vent 77, through the valve opening 88 and into the channel 83 until the plate 90 covers the outlet vent 77. The said movement of the lever plate 69 will cause the adjustment of the valve 45 to the position shown in Figure 3.

When the sliding valve 75 is adjusted to the neutral position shown in Figure 6 the opening 85 will coincide with the pressure vent 79, valve opening 86 will coincide with the pressure vent 80 and valve opening 89 will coincide with the outlet vent 78. Pressure will then be applied through both pressure vents 79 and 80 at opposite sides of the lever plate 69 as shown in Figure 6. The force exerted will always be greater on the side of plate 69 away from the outlet vent 78 until the plate 69 is forced to a middle position. Then the plate 90 will cover the outlet vent 78 and the pressure of the fluid medium from the opposite pressure vents will be equal holding the plate 69 in the neutral adjusted position and adjusting the valve 45 to a neutral position intermediate to that shown in Figures 3 and 5.

In the adjusted positions noted it will be readily seen that the pressure of the fluid medium will hold the plate 69 in its adjusted position, thus holding the valve 45 securely in adjusted position. There is further provided a check valve 92 in the outlet conduit 84 to prevent any possible back pressure from causing a change in the position of the plate 69. It will further be observed from Figure 6 that the pressure events in the housing 61 are positioned beyond the end of the stroke of the lever plate 69 thus permitting pressure upon the proper adjustment of the valve plate 75 to always be applied to the desired side of the plate 69.

There is further provided a spring member 93,

Figures 4 and 6 adapted to hold a ball 94 under spring tension in notches 95 in the valve 75 thereby holding the valve 75 in proper adjusted position until sufficient force is applied to the adjustment rod to release the same.

Also as shown in Figures 4 and 6, there is provided in the channel 131 the auxiliary channel 130. The said channel 130 is adapted to serve as a means to allow any fluid medium which may accumulate in either end of the channel 131 to escape to the opposite end of the channel 131 upon the adjustment of the valve plate 75 into such end of the said channel 131.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. A fluid control means, said control means comprising a valve casing, a valve body pivotally mounted in the casing, the valve body having provided an upper and a lower wall and two partition walls forming in the valve body an upper channel, a lower channel and a center channel, a fixed plate positioned intermediate said two partition walls and adapted to close the center channel upon pivotal adjustment of the valve body to a first position, and said fixed plate adapted to open said center channel upon pivotal adjustment of the valve body to a second position in which said two partition walls are positioned parallel to said fixed plate and in spaced relation thereto, and operator-operative means to selectively position the valve body to said first and second positions.

2. The combination comprising a housing having provided therein a chamber, a first member slidably mounted in said chamber for operating a control device, said chamber having provided fluid pressure inlet ports and outlet ports at opposite ends thereof and another outlet port intermediate the opposite ends of the chamber, and a second valve member being constructed and arranged to selectively open and close said ports for effecting movement of said first member by the fluid pressure to a position corresponding to the position of the selectively opened outlet port so as to effect a corresponding adjustment of the control device.

3. The combination defined by claim 2 including a closure plate carried by the first member for closing the outlet port selectively opened by the second valve member at the limit of movement of said first member by the fluid pressure.

4. A fluid control means comprising a valve casing, a valve body pivotally mounted in the casing, the valve body having an upper and a lower wall and two partition walls defining in the valve body an upper channel, a lower channel and a center channel, a fixed plate positioned intermediate said two partition walls and adapted to close the center channel upon pivotal adjustment of the valve body to a first position, said fixed plate extending parallel to said two partition walls and in spaced relation thereto so as to open said center channel upon adjustment of said valve body to a second position, a housing having a V-shaped chamber, a shaft mounted in the chamber for selectively positioning the valve body from the first to the second position and to a third position intermediate said first and second positions, a lever attached at one end to the shaft, and the lever adapted to pivot the shaft and swing from one end of the V-shaped chamber to the other end thereof, inlet ports provided in the V-shaped chamber at opposite ends of the V-shaped chamber, outlet ports at opposite ends of the V-shaped chamber and another outlet port intermediate the opposite ends of the chamber, a multi-channeled slidable valve having channels arranged to selectively connect said inlet ports to a source of fluid pressure, and said slidable valve having other channels arranged to selectively connect said outlet ports to a discharge conduit, the channels being so arranged that when said slidable valve is so positioned as to connect only the inlet port at one end of the chamber to the source of fluid pressure, the inlet port at the opposite end is closed by said slidable valve while the outlet port at said opposite end is opened by said slidable valve and the outlet port at the same end as said first mentioned inlet port and the aforesaid other intermediate outlet port are closed by said slidable valve to cause pivotal movement of the lever and said valve body to the first and second of said positions at the will of the operator of said slidable valve, and said slidable valve having the aforesaid channels so arranged therein as to open both said inlet ports to the source of fluid pressure upon said slidable valve being adjusted so as to selectively open said outlet port intermediate the opposite ends of the chamber to the discharge conduit so as to cause pivotal movement of the lever and said valve body to the third of said positions at the will of the operator of said slidable valve.

5. A fluid control apparatus comprising a valve housing having two separate fluid inlets, fluid outlet means and a fluid bypass means, a movable valve member adjustably mounted in said housing and having at least three different positions, said valve housing and valve member being constructed and arranged to selectively emit through said fluid outlet means the fluid from one of said inlets only in one position of the valve member, the fluid from both of said inlets through said outlet means in a second position of the valve member, and to bypass the fluid from both of said inlets through said bypass means in a third position of the valve member.

GEO. D. HUNTER.

REFERENCES CITED

The following references are of record in the file of this patent:

UNITED STATES PATENTS

| Number | Name | Date |
| --- | --- | --- |
| 213,944 | Sanford | Apr. 1, 1879 |
| 762,055 | Hibbard | June 7, 1904 |
| 780,195 | Kampmann | Jan. 17, 1905 |
| 813,209 | Holmes | Feb. 20, 1906 |
| 856,182 | Rempe | June 4, 1907 |
| 873,819 | Wing | Dec. 17, 1907 |
| 1,032,344 | Purpura | July 9, 1912 |
| 1,039,963 | Krarup | Oct. 1, 1912 |
| 1,203,689 | Blunt et al. | Nov. 7, 1916 |
| 1,235,817 | Lape | Aug. 7, 1917 |
| 1,262,437 | Bergman | Apr. 9, 1918 |
| 1,495,058 | Wille | May 20, 1924 |
| 2,485,723 | Fritzgerald | Oct. 25, 1949 |